June 20, 1961 S. GUZSKIE 2,989,679

MOTOR CONTROL CIRCUIT HAVING A HOLD CIRCUIT WITH PROGRAM MEANS TO DISABLE THE HOLD CIRCUIT

Filed Feb. 12, 1960

INVENTOR.
Stanley Guzskie
BY John L. Wiegreffe
ATTY.

United States Patent Office 2,989,679

Patented June 20, 1961

2,989,679

MOTOR CONTROL CIRCUIT HAVING A HOLD CIRCUIT WITH PROGRAM MEANS TO DISABLE THE HOLD CIRCUIT

Stanley Guzskie, Broadview, Ill., assignor to Admiral Corporation, Chicago, Ill., a corporation of Delaware Filed Feb. 12, 1960, Ser. No. 8,350
5 Claims. (Cl. 318—467)

Figure 1:
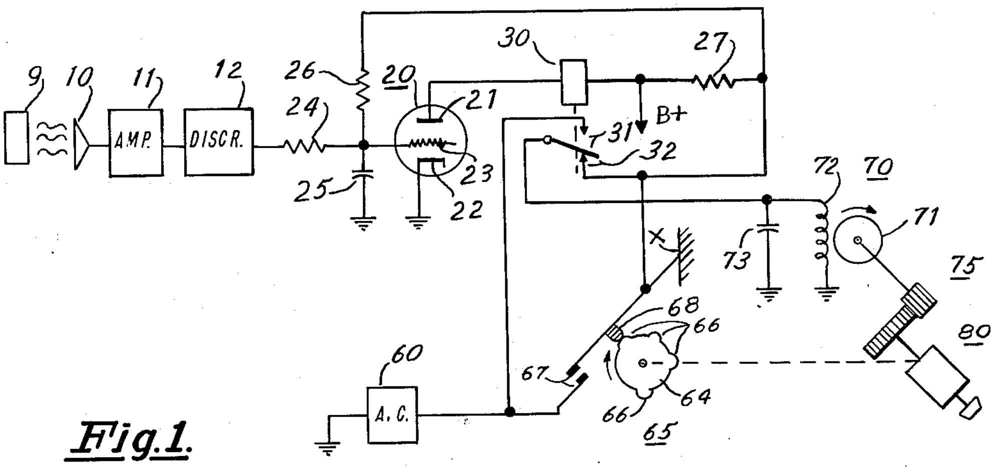

This invention relates generally to motor control circuits and particularly to motor control circuits which are adapted to be energized by pulses of energy for driving a driven means from any of a number of preselected points to a succeeding preselected point.

The invention in its broad aspects need not be confined to any particular environment but will be found useful in many different applications, especially those employing an initiating signal of limited duration. The invention has met with success in the field of remotely controlled television receivers and will be so described. However, it will be understood that this environment should in no way be construed as a limitation of the invention.

Recently a great deal of effort has been devoted to the development of systems for remotely controlling television receivers. In particular, the emphasis has been on wireless type remote controls, i.e., those in which the transmitter is physically independent of the controlled receiver. These transmitters usually produce some form of wave energy in response to actuation by the operator. The types of wave energy employed has included electromagnetic, magnetic, ultrasonic and light. When using all but the last of these, the transmitter has generally been provided with means for generating different frequencies of these energies for the purpose of selectively controlling different functions of the television receiver. The particular system utilizing light energy had various target areas (photo cells) positioned on the receiver. The operator aimed a light source at the target area corresponding to the control function desired.

All of these wireless remote control systems employed some type of receiving means, hereinafter referred to as a control unit, on the television receiver itself for receiving and detecting the transmitted signal. In the first three systems mentioned above, the control unit was generally provided with means for determining, on the basis of the frequency of the control signal, the television receiver function to be controlled.

Additionally, all of the above systems employed some sort of motor device for driving the tuner mechanism of the television receiver. Programming means were provided (generally directly coupled to the tuner) to produce a "stop" signal at preselected tuner positions or, in the alternative, a "stop" signal at all tuner positions. Thus if it was desired to switch the station tuning of the receiver, the operator depressed the appropriate button or key on the transmitter which then emitted a signal that was effective, upon being received and detected by the control unit, for initiating operation of the motor driven tuner. Thereafter the tuner was stopped at the next preselected position upon occurrence of the "stop" signal.

Nearly all of the control units used an electron valve operated motor relay for energizing the tuner drive motor. In most of these systems it was also necessary to build in some sort of noise immunity to guard against unwanted operation.

Referring specifically to the system utilizing ultrasonic signals, it has been the practice to adjust the control unit so that it responds only to control signals of predetermined minimum amplitude and duration. It is obvious, of course, that as the transmitter is portable it may be operated at varying distances from the television receiver and, due to air damping, the distance will be determinative of the received signal strength. In one well known system the control unit was designed to have sufficient gain to operate the motor relay in response to a control signal transmitted from about thirty feet from the television receiver. This system used a fast AGC arrangement to prevent overload from stronger signals. One of the problems encountered was that such things as relay "hold in" time intervals, motor bearing friction, tuner friction and slight misadjustment of the programming means often resulted in malfunctioning of the system when subjected to weak signals. What often occurred was that the motor relay operated in response to the weak signal, but due to the conditions above mentioned, restored or released before the programming means had been moved sufficiently to complete an auxiliary energizing path to the motor.

One solution to this problem involved connecting a holding circuit arrangement having a fixed time constant to the input circuit of the relay tube or valve as soon as the motor relay operated. A circuit of this type is described in a co-pending application of Meyer Marks, Serial No. 799,901, filed March 17, 1959. An improved version of this holding circuit arrangement, utilizing a holding circuit without a limiting time constant in conjunction with a capacitor arranged to deliver a "stop" signal is included in a co-pending application of Joseph Gardberg, Serial No. 808,712, filed April 24, 1959.

The circuit of this invention is a further improvement over the circuits in the above mentioned co-pending applications. Accordingly, it is a general object of this invention to provide an improved motor control circuit of the type employing a control or initiating signal of limited duration.

Another object of this invention is to provide an improved motor control circuit of the type mentioned which is more economical and reliable than circuits of this type heretofore known.

Figure 2:
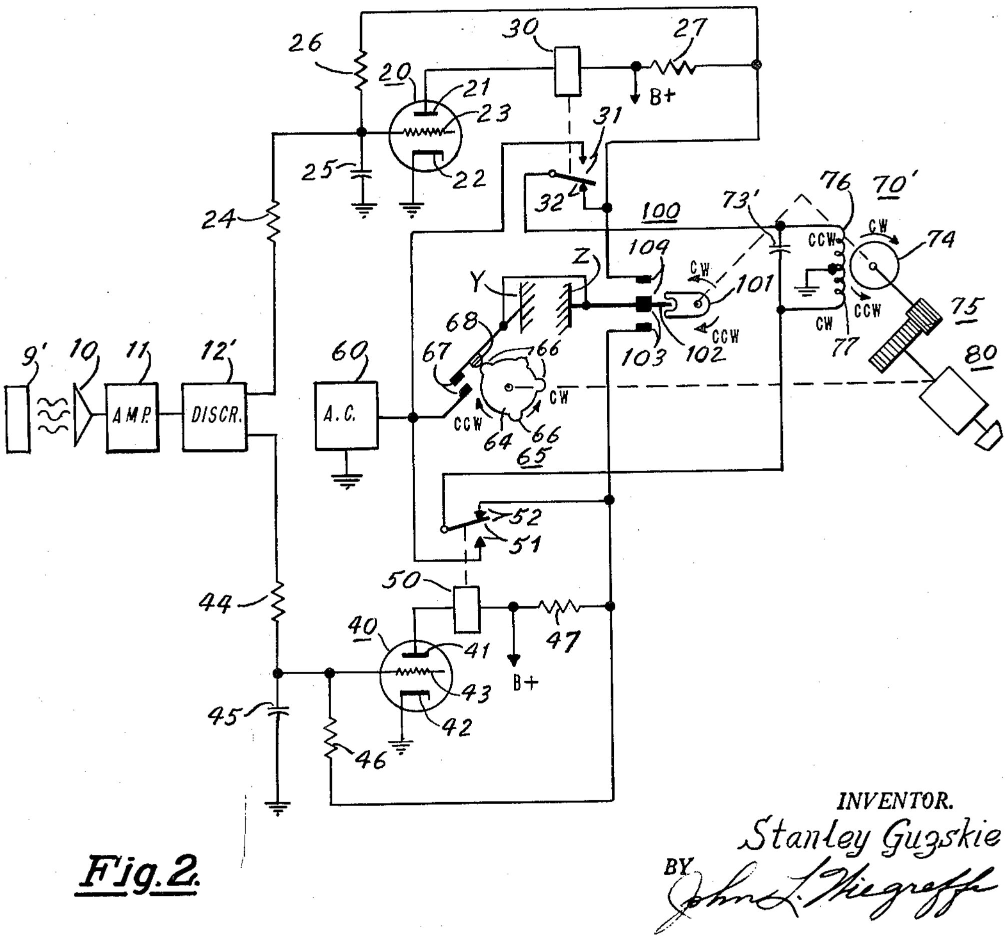

These and other objects and advantages of the invention will be more readily understood by a reading of the specification in conjunction with the drawings in which FIG. 1 represents a partial schematic diagram of a unidirectional motor control system embodying the invention and in which FIG. 2 represents a partial schematic diagram of a bidirectional motor control system embodying the invention.

Referring now to FIG. 1 of the drawings, it will be noted that a driven means or element, which may be a tuner in a conventional television receiver, is drivingly coupled to the rotor 71 of a motor 70 by means of a gearing arrangement 75. Motor winding 72 is arranged to be energized from A.C. source 60 through "make" contacts 31 of relay 30 and alternatively through contacts 67 of program means 65 and "break" contacts 32 of relay 30. Relay 30 is included in the output circuit of relay tube 20, which has an input circuit comprising resistor 24 and capacitor 25. A signal translation channel comprising microphone 10, amplifier 11 and discriminator or detector 12 is coupled to the input circuit of tube 20. Means (not shown) in discriminator 12 are provided for applying a negative bias voltage to this input circuit to maintain tube 20 normally nonconductive.

Upon reception, by microphone 10, of a control signal transmitted by transmitter 9, the signal is amplified in amplifier 11 and detected in discriminator 12 where it conditions the circuitry (not shown) of discriminator 12 to reduce the bias on tube 20. Resistor 24 and capacitor 25 provide an integrating action and are so chosen that the signal, to be effective, must have a predetermined minimum amplitude for a predetermined minimum duration. After the signal has persisted for the minimum time, tube 20 is driven conductive. This arrangement provides for noise immunity of the control system.

A holding means or holding circuit for maintaining tube 20 conductive once conduction is initiated therein is coupled to the input circuit of tube 20. This circuit comprises resistor 27 and resistor 26 which are fed from a source of positive potential B+. Normally the junction of resistors 26 and 27 is held at substantially D.C. ground potential through contacts 32 of relay 30 and A.C. motor winding 72. Thus it will be seen that the holding circuit is normally disabled, i.e., ineffective.

Upon receipt of a proper signal by microphone 10, relay tube 20 is driven sufficiently conductive to energize relay 30. This energization path extends from B+ to ground through relay 30 and the electron flow between cathode 22 and anode 21 of tube 20. Upon energization of relay 30, "break" contacts 32 are opened and "make" contacts 31 are closed. The opening of contacts 32 removes the ground, through motor winding 72, from the junction of resistors 26 and 27 and enables the holding circuit in a manner to be described in more detail below. Closure of contacts 31 connects A.C. source 60 to motor winding 72, resulting in energization of motor 70. As rotor 71 begins to turn, driven element 80 is driven in accordance with the operation of gearing 75. It should be noted at this point that gearing 75 is illustrative only and many different coupling arrangements may be employed with equal facility.

Programming means 65 comprises a program wheel 64 having a number of cam lobes 66 displaced about the periphery thereof. Program wheel 64 is mechanically coupled to driven element 80 as indicated by the dashed line connecting these two elements. Contacts 67 associated with program means 65 are opened when cam follower 68 rides up on any one of cam lobes 66. Similarly, whenever cam follower 68 is riding along the periphery of program wheel 64 at a location where there is no cam lobe, contacts 67 are closed. Cam lobes 66 have been positioned at points on the periphery of program wheel 64 which correspond to station tuning positions of driven element 80, which in the embodiments chosen to illustrate the invention, is a conventional television receiver tuner. The reference character X indicates an insulated, mechanical connection for the movable one of contacts 67. The letters Y and Z on FIG. 2 refer to similar insulated, mechanical connections.

As program wheel 64 is driven by the movement of driven element 80, contacts 67 close and re-establish the D.C. ground at the junction of resistors 26 and 27. This D.C. ground is through A.C. source 60 and contacts 67. Generally the control signal has subsided by this time, and upon disablement of the holding circuit, tube 20 ceases conduction. Relay 30 is deenergized, thus opening contacts 31 and closing contacts 32. Contacts 31, in opening, break the original energizing path for motor winding 72, but contacts 32, upon closing almost immediately thereafter, complete an auxiliary energizing path to motor winding 72. This path extends to winding 72 from A.C. source 60 through contacts 67 of program means 65 and contacts 32 of relay 30. Rotor 71 continues rotating until program wheel 64 reaches the next preselected station tuning point at which time the appropriate one of cam lobes 66 opens contacts 67 which action breaks the auxiliary energizing path for motor winding 72.

The holding circuit, as mentioned previously, is normally held disabled by the D.C. ground at the junction of resistors 26 and 27. Upon removal of this ground, the connection extending from B+ through resistors 27 and 26 to grid 23 of tube 20 is activated. This connection results in grid current flow between grid 23 and cathode 22. The effective grid to cathode resistance of the tube during grid current flow is about one-thousand ohms and consequently, grid 23 is maintained positive with respect to cathode 22 when the holding circuit is active. Thus conduction continues in tube 20, irrespective of removal of the control signal, and relay 30 is maintained in an energized state. This circuit provides a positive acting arrangement for insuring that, when tube 20 is driven sufficiently conductive to energize relay 30, motor 70 will be held energized until driven element 80 reaches the next preset tuning position. It should be particularly noted that this result is achieved without employing either; a holding circuit having a predetermined time constant; or a holding circuit without a limiting time constant in conjunction wth a capacitor or other means for developing a "stop signal."

FIG. 2 shows a bidirectional motor control circuit utilizing the invention. In this figure elements performing the same or similar functions as corresponding elements in FIG. 1 are designated by like reference numerals. Transmitter 9′ is capable of emitting two different signals in accordance with the direction of movement desired for the driven element. Therefore, discriminator 12′ includes circuitry (not shown) capable of differentiating between at least these two signals. Normally the control signals differ on the basis of frequency and, responsive to receipt of a control signal of one frequency, for example, the upper terminal of discriminator 12′ is driven positive whereas, responsive to receipt of the control signal of said other frequency, the lower terminal of discriminator 12′ is driven positive. In such an arrangement two distinct control circuits or channels must be provided. Each control channel includes an electron valve (vacuum tube in the case shown), a relay and a separate holding circuit. Motor 70′ is of the bidirectional type having a winding 76 for counterclockwise rotation and a winding 77 for clockwise rotation. Switch means 100 is provided for connecting programming means 65 to whichever of the control circuits is in operation.

Switch means 100 comprises a substantially U-shaped element 101 which is frictionally coupled (indicated by dashed line) to the shaft of armature 74. Upon rotation of armature 74 element 101 is moved in the same direction to close either contacts 104 or 103. Thereafter element 101 slips on the shaft of armature 74, yet maintains the closed contacts in a closed condition throughout rotation of armature 74. These devices are well known in the art of motor drives.

Assume a proper control signal is received by microphone 10 and amplified by amplifier 11. Assume also that this control signal is of a frequency such that the lower output of discriminator 12′ is driven positive. As explained previously with reference to FIG. 2, resistor 44 and capacitor 45 in the input circuit of tube 40 are effective to drive grid 43 positive after a predetermined time of application of a signal of a predetermined minimum amplitude. Tube 40 conducts and energizes relay 50. Relay 50 in operating opens contacts 52 and closes contacts 51. The holding circuit for tube 40 comprises serially connected resistors 47 and 46 which are fed from B+ and connected to grid 43 of tube 40. Before energization of relay 50, the junction of resistors 46 and 47 was maintained at D.C. ground potential through contacts 52 of relay 50 and winding 77 of motor 70′. Thus, the opening of contacts 52, upon energization of relay 50, enables the holding circuit and tube 40 is maintained conductive despite the expiration of the control signal. Closure of contacts 51 connects A.C. source 60 to motor winding 77 thus energizing motor 70′.

As indicated in FIG. 2, energization of winding 77 causes clockwise rotation of rotor 74. Element 101 of switch means 100 moves clockwise, as shown, and closes contacts 103. As rotor 74 continues moving, program wheel 64 moves and cam follower 68 rides off of the cam lobe 66 on which it was resting, thus opening contacts 67. This action has been described previously. Upon closure of contacts 67, the D.C. ground at the junction of resistors 46 and 47 is replaced through contacts 103, contacts 67 and A.C. source 60 and the holding circuit is again disabled. Tube 40 ceases conduction and relay 50 is deenergized. Upon deenergization, relay 50 opens contacts 51 which break the original energizing path to winding 77. However, closure of contacts 52 completes another energizing path to this winding. This path extends from A.C. source 60, through contacts 67, 103 and 52, to motor winding 77. Thus armature 74 continues to rotate until driven means 80 reaches the next preselected stopping point at which time a subsequent cam lobe 66 forces cam follower 68 to open contacts 67 and break the energizing path to motor winding 77. Armature 74 is quickly brought to rest and element 101 of switch means 100 resumes its normal neutral position.

Upon receipt of the other of the two control signals the upper terminal of discriminator 12' is driven positive and tube 20 conducts. Operation of this portion of the circuit is similar to that just described except that winding 76 is energized and motor 74 is driven counterclockwise. Thereupon element 101 of switch means 100 closes contacts 104 to connect programming means 65 to the upper control circuit. Thereafter motor operation is stopped as described above.

Thus it will be seen that the invention provides for more economical and reliable operation of motor control systems, especially those adapted for remote control of television receivers. It should be pointed out specifically that the term electron valve used throughout is intended to include semi-conductor valves such as transistors. While transistors per se have not been illustrated, it will be appreciated that anyone skilled in the art could easily employ them in lieu of the vacuum tubes shown. While the various embodiments of the invention have been described in a television environment it will be understood that the scope of the invention is only to be limited by the appended claims.

What is claimed is:

1. A control system comprising; starting means for generating a start signal; driving means; driven means drivingly coupled to said driving means and adapted for movement between at least two preselected positions; a source of power for said driving means; an electron valve having an input circuit coupled to said starting means and an output circuit; a normally disabled holding circuit connected to said input circuit, said valve being driven conductive and energizing said output circuit responsive to a start signal from said starting means; means included in said output circuit and effective upon energization thereof for enabling said holding circuit to maintain conduction in said valve and for connecting said power source to said driving means; a program device coupled to said driven means, said program device including means for disabling said holding circuit and establishing a different connection between said power source and said driving means during movement of said driven means from one of said preselected positions to the other of said preselected positions and for deenergizing said driving means when said driven means reaches said other preselected position.

2. In combination; a signal translation channel; driving means; a source of power for said driving means; driven means arranged to be sequentially driven between adjacent ones of a plurality of preselected positions by said driving means; programming means coupled to said driven means for terminating movement thereof when said driven means is in any of said preselected positions; an electron valve having an input circuit coupled to said translation channel and an output circuit coupled to said driving means; a normally disabled holding circuit connected to said input circuit; said electron valve being driven conductive responsive to a signal having a predetermined minimum amplitude and duration in said signal translation channel; said output circuit including circuit means responsive to conduction in said valve for enabling said holding circuit to maintain conduction in said valve and for establishing a first energizing path between said power source and said driving means, said programming means arranged to disable said holding circuit when said driven means is between adjacent ones of said preselected positions and to establish a second energizing path between said power source and said driving means upon cessation of conduction in said valve, whereby said programming means is effective to disrupt said second energizing path to said driving means and terminate movement of said driven means when the next preselected position is reached by said driven means.

3. In a control system of the type having a driving element for driving a driven element from any one of a plurality of predetermined angular positions to the next adjacent one of said positions responsive to a remotely transmitted signal of limited duration being received, amplified and detected by receiving means, and including an electron valve having a control relay in its output circuit for connecting a source of energizing potential to said driving means responsive to receipt of said transmitted signal, the improvement comprising; a normally disabled holding circuit connected to said electron valve; programming means having two distinct operational states coupled to said driven element, said programming means assuming the first of said two states whenever said driven element is substantially in any of said plurality of angular positions and the second of said states for all other positions of said driven element; said relay being energized responsive to conduction in said valve and enabling said holding circuit to maintain said valve conductive, and also establishing an energizing connection between said source of potential and said driving element; said programming means upon assuming said second state disabling said holding circuit and preparing a different energizing path for said driving means to be completed upon deenergization of said relay, whereby said driving element is deenergized by said programming means resuming said first state when said driven element reaches the next preselected angular position.

4. In a motor control system including a motor for driving a driven element from any of a plurality of preselected stopping points to the next adjacent one of said stopping points in response to a control signal of predetermined minimum duration; an electron valve having an input circuit and an output circuit; means for applying said control signal to said input circuit to effect conduction in said valve; a relay in said output circuit; a source of power for said motor; programming means having a circuit opening position and a circuit closing position coupled to said driven element, said programming means assuming its circuit opening position when said driven element is substantially in any of said plurality of preselected stopping points and its circuit closing position for all other positions of said driven element; a normally disabled holding circuit connected to said input circuit, said relay upon energization enabling said holding circuit to maintain said valve conductive and connecting said power source to said motor; said programming means upon assuming its circuit closing position preparing a different energizing connection between said motor and said power source and disabling said holding circuit, said different energizing connection being completed upon deenergization of said relay so that when said driven element reaches the next succeeding one of said plurality of preselected stopping points said programming means assumes its circuit opening position and deenergizes said motor.

5. A motor control system including a bi-directional motor adapted to be actuated by either of two different control signals of substantially equal duration for driving a driven element between adjacent ones of a plurality of preselected stopping points, said driven element being driven clockwise or counterclockwise by said motor in accordance with which of said two control signals is employed comprising; a pair of control circuits; a common signal translation channel including discriminating means having two separate outputs; means for introducing said signals into said common channel, said discriminating means energizing one of said outputs responsive to the first of said two signals; each of said outputs being connected to a respective one of said control circuits; each of said control circuits including an electron valve having an input circuit, an output circuit including a relay and a holding circuit connected to the input circuit of said valve; a source of power for said motor; a program device having first and second conductivity positions coupled to said driven element; said program device assuming said first conductivity position when said driven element is substantially at any of said preselected stopping points and assuming said second conductivity position when said driven element is at any other point; each said valve being driven conductive only in response to energization of its associated discriminating means output, each said relay operable upon conduction of its associated valve to connect said source of power to said motor and to enable its associated holding circuit to maintain its valve conductive; switch means frictionally coupled to said motor and responsive to the direction of rotation thereof for connecting said program device to the energized one of said control circuits; said program device assuming said second conductivity position in response to said driven element being driven from any of said preselected stopping points and cooperating with said switching means to disable said enabled holding circuit; the operative connection between said source of power and said motor being transferred upon deenergization of said energized relay to said program device and said switch means, whereby said motor is deenergized and said driven element stopped when said driven element reaches the next succeeding preselected stopping point.

References Cited in the file of this patent

UNITED STATES PATENTS 2,930,955 Bourget et al. ---------- Mar. 29, 1960